US007191051B2

(12) United States Patent
Rueger et al.

(10) Patent No.: US 7,191,051 B2
(45) Date of Patent: Mar. 13, 2007

(54) METHOD AND APPARATUS FOR OPERATING AN INJECTION SYSTEM IN AN INTERNAL COMBUSTION ENGINE

(75) Inventors: Johannes-Joerg Rueger, Vienna (AT); Udo Schulz, Vaihingen/Enz. (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/535,643

(22) PCT Filed: Nov. 4, 2003

(86) PCT No.: PCT/DE03/03647

§ 371 (c)(1),
(2), (4) Date: Dec. 30, 2005

(87) PCT Pub. No.: WO2004/048763

PCT Pub. Date: Jun. 10, 2004

(65) Prior Publication Data

US 2006/0129302 A1 Jun. 15, 2006

(30) Foreign Application Priority Data

Nov. 25, 2002 (DE) ................................ 102 54 844

(51) Int. Cl.
*B60T 7/12* (2006.01)
*F02M 51/00* (2006.01)

(52) U.S. Cl. ........................ 701/104; 123/490; 123/609

(58) Field of Classification Search ................ 701/101, 701/104, 105; 123/490, 492, 594, 609, 618, 123/626

See application file for complete search history.

(56) References Cited

U.S. PATENT DOCUMENTS

| | | | | |
|---|---|---|---|---|
| 4,889,100 | A * | 12/1989 | Nakaniwa et al. .......... | 123/492 |
| 5,546,909 | A * | 8/1996 | Messih et al. .............. | 123/492 |
| 5,638,798 | A * | 6/1997 | Guido et al. ................ | 123/609 |
| 5,732,381 | A * | 3/1998 | Guido et al. ................ | 701/104 |
| 6,076,503 | A * | 6/2000 | Carpenter ................... | 123/438 |

FOREIGN PATENT DOCUMENTS

| | | |
|---|---|---|
| DE | 39 29 747 | 3/1991 |
| DE | 199 05 340 | 8/2000 |
| DE | 100 02 270 | 6/2001 |
| DE | 100 32 022 | 1/2002 |
| EP | 1 138 919 | 10/2001 |

* cited by examiner

*Primary Examiner*—John T. Kwon
(74) *Attorney, Agent, or Firm*—Kenyon & Kenyon LLP

(57) ABSTRACT

In a method and an apparatus for operating an injection system of an internal combustion engine, triggering of an injection actuator being performed on the basis of at least one state variable of the injection system, in order to enhance the quantitative accuracy with which fuel is metered provision is made that the at least one state variable is sensed and temporarily stored; the at least one injection actuator is triggered with a triggering pulse of definable pulse duration and definable initial pulse height; during the triggering of the at least one injection actuator, an injection detection is performed; the pulse height of the triggering pulse is incremented in definable steps, at the defined pulse duration, until an injection is detected; and when an injection is detected, the pulse height of the triggering pulse causing the injection is permanently stored as a function of the sensed state variable, and in future operation of the injection system is taken as the basis for triggering the at least one injection actuator.

16 Claims, 4 Drawing Sheets

Fig.1 (Existing art)

Fig.2 (Existing art)

METHOD AND APPARATUS FOR OPERATING AN INJECTION SYSTEM IN AN INTERNAL COMBUSTION ENGINE

FIELD OF THE INVENTION

The invention relates to a method and an apparatus for operating an injection system of an internal combustion engine.

BACKGROUND INFORMATION

A high-pressure injection, and an injection valve (injector) equipped with a piezoactuator as the injection actuator, are described in German Patent Application Nos. DE 100 32 022 A1 and DE 100 02 270 C1. An injection valve of this kind serves for precisely regulatable fuel metering into the combustion chamber of the internal combustion engine.

In an injection valve of this kind, the piezoactuator serves to control the motion of a nozzle needle of the injection valve, either the nozzle needle itself or a control valve controlling the motion of the nozzle needle being triggered.

For exact metering of fuel into the combustion chamber, the most accurate possible knowledge of the stroke length of the piezoactuator or nozzle needle, in interaction with the control valve, is necessary. As is evident from FIG. 1, in the piezo common rail (PCR) systems described in German Patent Application No. DE 100 02 270 C1, the control valve is actuated via the piezoactuator and an interposed hydraulic coupler, the valve in turn controlling the nozzle needle motion by modulation of the pressure in a so-called control chamber.

The pulsed triggering voltage of these piezoactuators that is required for a specific injected quantity depends, as is conventional, on state variables of the injection system such as, for example, the rail pressure instantaneously present in a common rail, or the temperature of the piezoactuator. A corresponding adaptation of the triggering voltage must therefore take place in order to make possible very small injected quantities. The aforesaid dependence on the rail pressure results from the aforementioned manner of operation of the injection valve, and the aforesaid temperate dependence from the change in the stroke length of the piezoactuator with temperature. The effect on injected quantity results from the difference in actual triggering onset and triggering end with varying actuator stroke length or with varying hydraulic and mechanical operating parameters.

In addition to the aforementioned state variables, there are also sample-to-sample variations in particular in the actuator stroke length, and variations in the function of the hydraulic coupler, in the control valve seat, and the like.

Conventionally, the aforesaid effects are taken into account in the context of a “worst-case” evaluation performed on a steady-state basis, i.e., they cannot be taken into account in the context of an activation occurring during operation of the internal combustion engine. It is therefore not possible to improve the accuracy of the injected quantities even further during operation. This is disadvantageous specifically with regard to emissions standards that must be met in the future.

German Patent No. DE 39 29 747 A1 describes a method for controlling a fuel injection system having a high-pressure fuel pump, the fuel quantity to be injected into the respective combustion chambers of the internal combustion engine being controlled by means of solenoid valves. Production- and aging-related variations in the fuel quantity injected into the individual combustion chambers cause different fuel quantities to be delivered for the same triggering signal, resulting, in particular with very small quantities injected in preinjection operations, in considerable quantity errors. To avoid these variations, in certain operating states of the internal combustion engine a determination is made of the pulse duration of the triggering pulses of the solenoid valve at which a preinjection is currently beginning. Based on the triggering pulse duration thus determined, equalization signals for the triggering pulses are created and are permanently stored.

SUMMARY

It is an object of the present invention to improve a method and an apparatus of the kind cited initially in such a way that by adaptation of the triggering voltage of injection actuators, e.g., piezoactuators, of an injection system, the quantitative accuracy with which fuel is metered is, in particular, enhanced even during operation of the internal combustion engine or of an underlying motor vehicle.

In the example method according to the present invention for operating an injection system, for example a common rail system or unit injector system of an internal combustion engine having at least one injection actuator controllable by means of triggering pulses, triggering of the injection actuator being dependent on at least one state variable of the injection system, first the at least one state variable is sensed and temporarily stored. Then at least one of the injection actuators is triggered with a triggering pulse of definable pulse duration and definable initial pulse height, and during that an injection detection is performed. If initially no injection is detected, the pulse height of the triggering pulse is incremented in definable steps, at the defined pulse duration, until an injection is detected. When an injection is detected, the pulse height of the triggering pulse causing the injection is permanently stored as a function of the sensed state variable, and in future operation of the injection system is taken as the basis for triggering the at least one injection actuator.

An advantage of the method according to the present invention may be that the triggering voltage necessary for each individual injection actuator or injector in the particular operating condition of the injection system, for example at the instantaneously existing rail pressure and temperature of the injection actuator or injector, is adapted, during operation of the internal combustion engine or of the underlying motor vehicle, to the operating state that currently exists. The aforesaid state variable of the injection system also encompasses, in the present case, operating variables of the injection actuator itself that derive, in particular, from sample-to-sample variations in the manufacture thereof.

The present invention is based, in particular, on the effect that with the injection valves or injection actuators relevant here, a minimum triggering voltage that depends on rail pressure is necessary in order to achieve an effective injection. If the injection actuator has a lower voltage applied to it, however, the force generated thereby is not sufficient to open the control valve against the rail pressure.

The present invention is also based on the recognition that as the triggering voltage is successively increased, an injection instantly begins as soon as the triggering voltage is sufficiently high. In other words, a sharp separation exists with regard to the system reaction in terms of insufficient/sufficient triggering voltage. The proposed method makes use of this property in that the values of the control voltage U_erf adapted during operation of the internal combustion engine are used to ascertain characteristic curve(s), characteristics diagrams, or tables of, in particular, the value pairs U_erf(p_rail) and/or U_erf(T_Aktor) with great precision under real operating conditions.

A further advantage is the fact that the triggering voltage can be adapted, without additional sensor outlay, to changing operating conditions of the internal combustion engine, in particular to changing state variables of the injection system, the result being even more precise fuel monitoring as compared with conventional systems.

The example method may make possible adaptation of the respective electrical triggering voltage for fuel metering, specifically for each injection valve or injector and individually for each combustion chamber of the internal combustion engine.

The present invention further concerns an apparatus in particular for carrying out the aforesaid method, which comprises a first arrangement to sense the at least one state variable and for temporarily storing whatever state variable is sensed; a second arrangement to trigger the at least one injection actuator with a triggering pulse of definable pulse duration and definable initial pulse height; a third arrangement to perform an injection detection upon triggering of the at least one injection actuator; a fourth arrangement to increment the pulse height of the triggering pulse in definable steps at the defined pulse duration; and a fifth arrangement to permanently store the pulse height of the triggering pulse causing the injection as a function of the sensed state variable, in the event an injection is detected.

BRIEF DESCRIPTION OF THE DRAWINGS

The present invention will be explained below in further detail with reference to example embodiments and with reference to the figures, from which further features and advantages of the present invention are evident.

DETAILED DESCRIPTION OF EXAMPLE EMBODIMENTS

Figure 1:
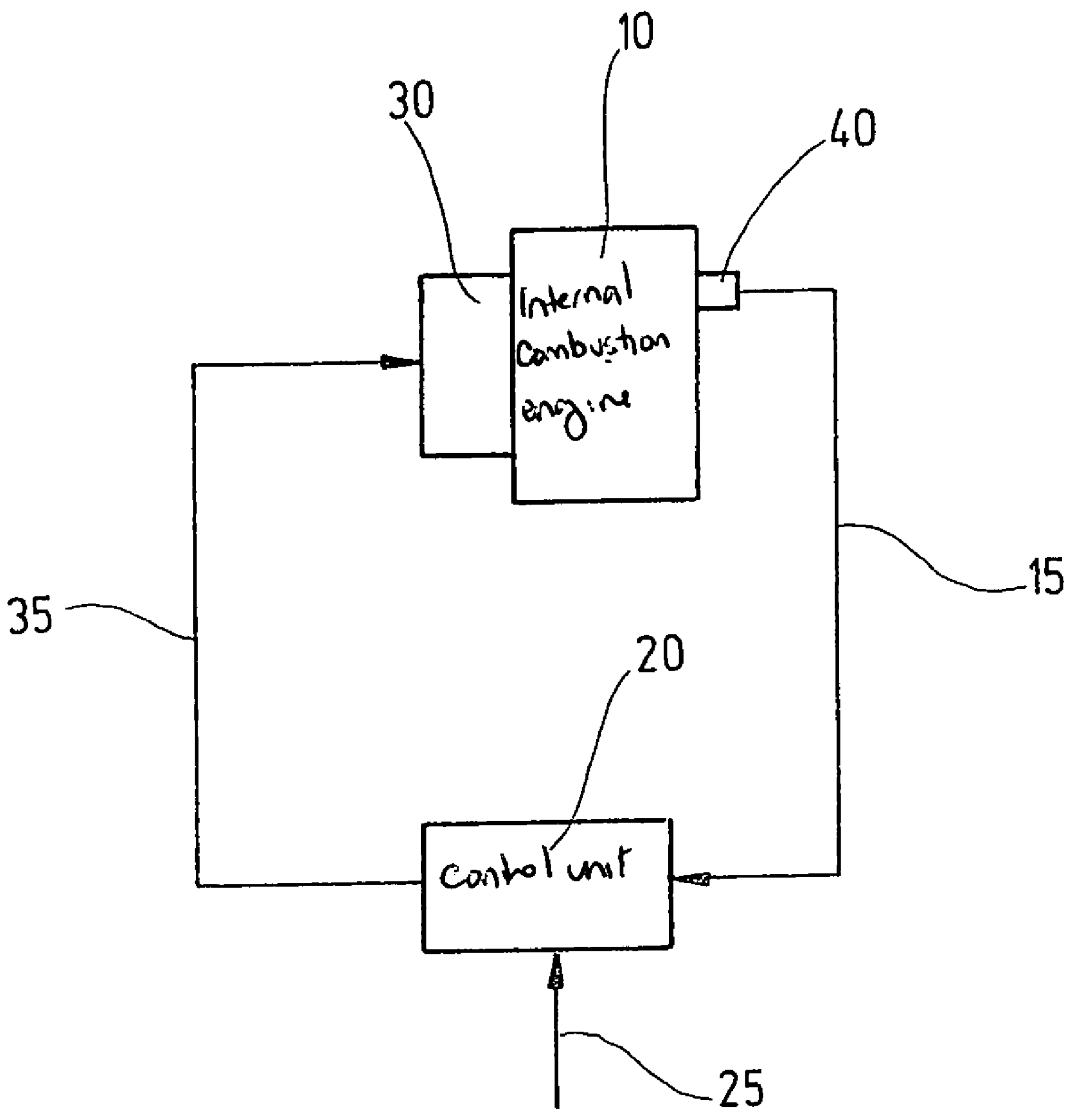
FIG. 1 is a simplified block diagram of a conventional injection system.

FIG. 1 schematically shows the construction of a fuel injection system of a compression-ignited internal combustion engine described in, for example, German Patent No. DE 39 29 747 A1. Internal combustion engine 10, depicted here only schematically, receives a specific fuel quantity metered to it by an injection unit 30. The instantaneous operating state of internal combustion engine 10 is sensed by means of sensors 40, and measured values 15 thus sensed are transferred to a control unit 20. These measured values encompass, for example, the rotation speed and temperature of the internal combustion engine, as well as the actual injection onset and possibly also other variables 25 that characterize the operating state of the internal combustion engine, for example the position of an accelerator pedal 25 or the ambient atmospheric pressure. On the basis of measured values 15 and further variables 25, control unit 35 calculates triggering pulses 35 in accordance with the fuel quantity commanded by the driver, those pulses being applied to a quantity-determining element of injection unit 30. Serving as the quantity-determining element therein is a solenoid valve which is disposed so that the fuel quantity to be injected is defined by the opening duration and closing duration of the solenoid valve. It should be noted, however, that other electrically controllable injection valves having, for example, piezoactuators can also be provided instead of solenoid valves. The method described below is, however, unaffected thereby.

The solenoid valve (not depicted) is disadvantageous in that different closing times can result from an identical triggering pulse, and therefore different fuel quantities are injected for the same triggering pulse duration and otherwise identical operating parameters. Since the triggering pulses are usually very short, especially in the case of preinjections, it can then happen that with individual solenoid valves no preinjection occurs, or the preinjection becomes so great that the emissions values of the internal combustion engine deteriorate.

Figure 2:
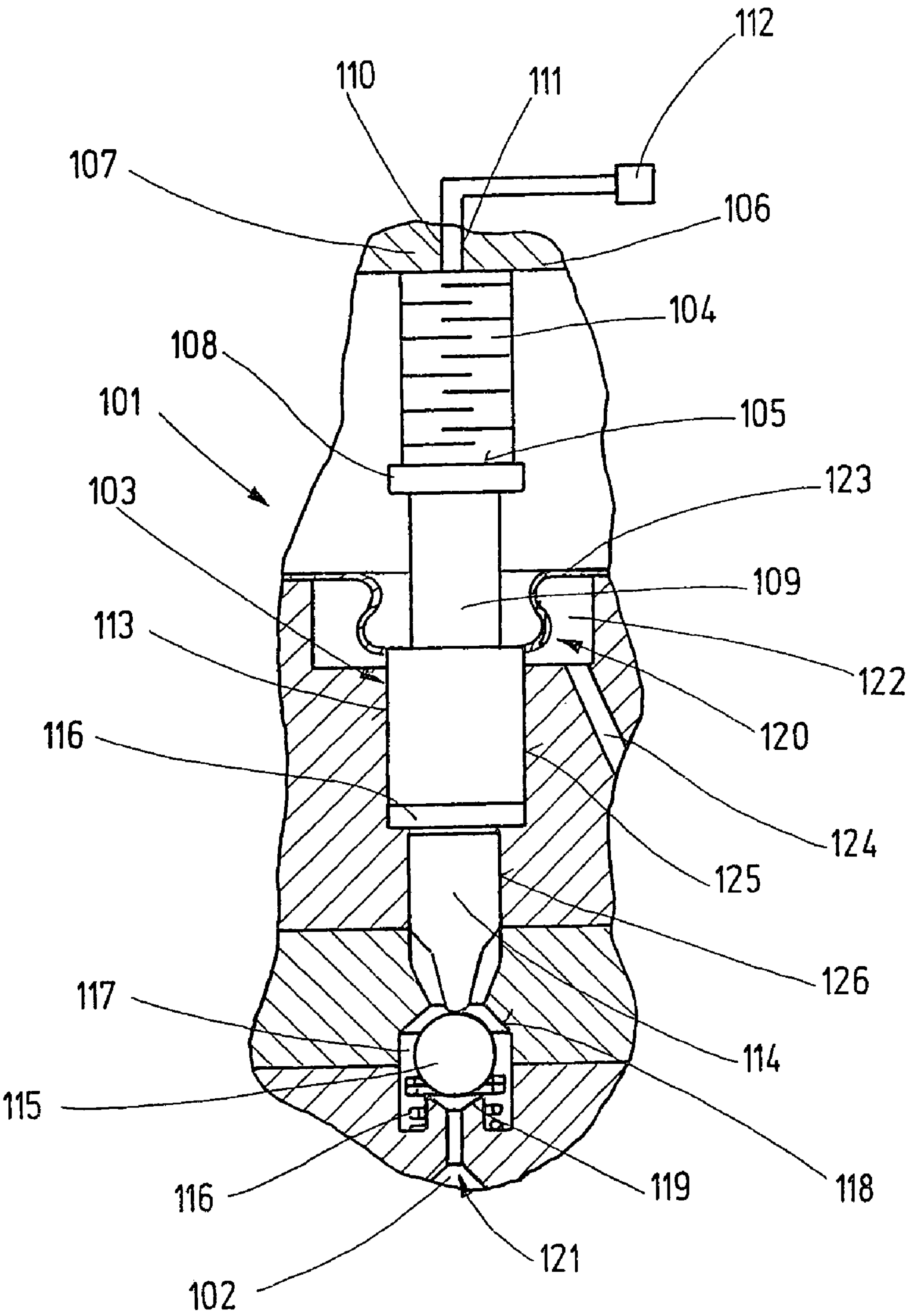
FIG. 2 is a schematic partial depiction in longitudinal section of a conventional fuel injection valve for internal combustion engines.

FIG. 2 depicts, in a sectioned drawing, a piezoelectrically controllable injection valve 101, described in, for example, German Patent Application No. DE 100 02 270 C1. Valve 101 comprises a piezoelectric actuator 104 for actuating a valve member 103 axially displaceable in a bore 113 of a valve body 107. Valve 101 furthermore comprises a positioning piston 109 adjacent to piezoelectric actuator 104, as well as an actuation piston 114 adjacent to a valve closing member 115. Disposed between pistons 109, 114 is a hydraulic chamber 116 acting as a hydraulic transmission. Valve closing member 115 coacts with at least one valve seat 118, 119, and separates a low-pressure region 120 from a high-pressure region 121. An electrical control unit 112, indicated only schematically, supplies the triggering voltage for piezoelectric actuator 104 as a function in particular of the pressure in high-pressure region 121.

Figure 3:
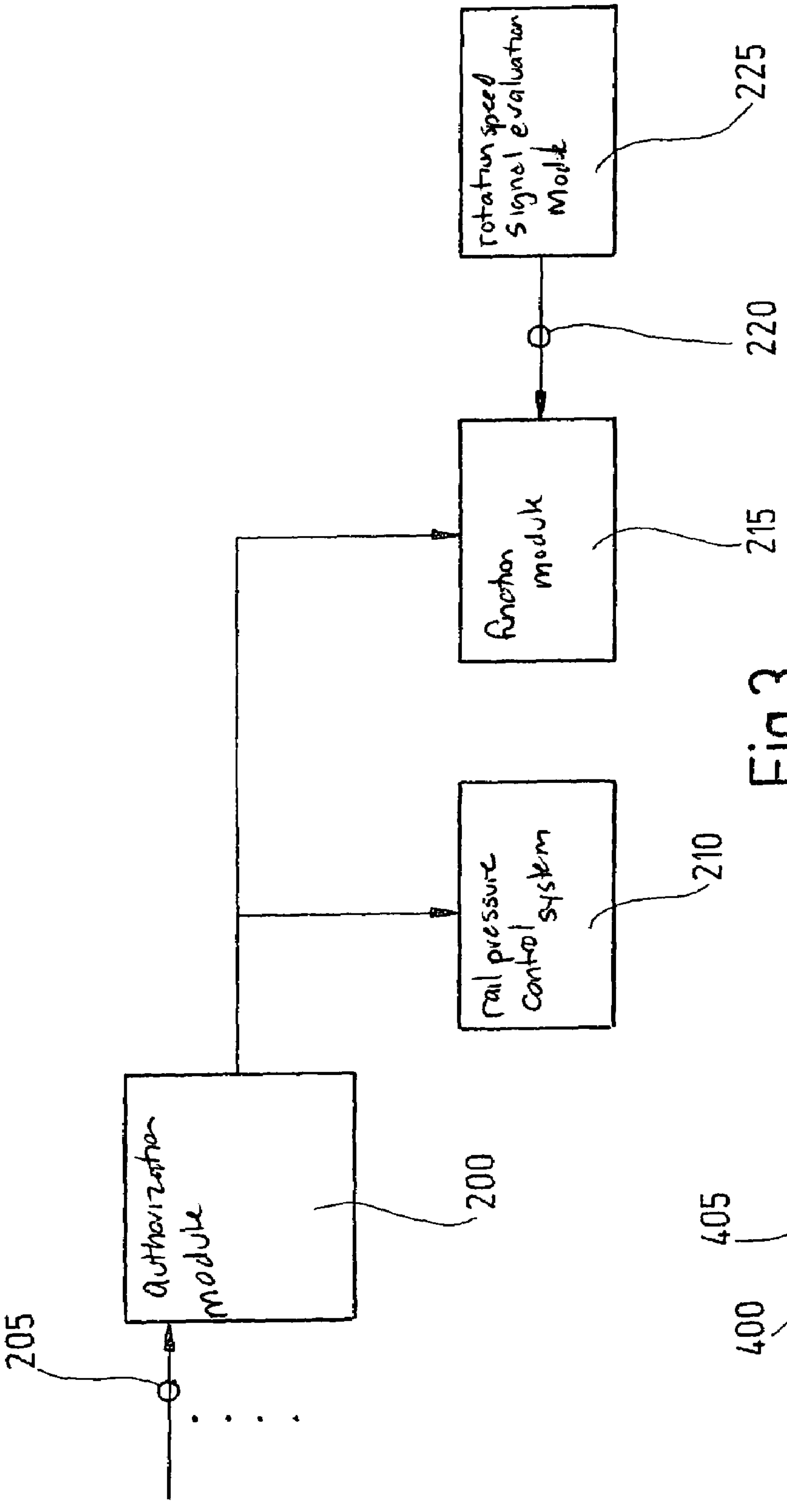
FIG. 3 is a block diagram of an example device for operating a common rail injection system of an internal combustion engine configured to carry out the example method according to the present invention.

The device shown in FIG. 3 for operating a common rail injection system of an internal combustion engine encompasses a so-called authorization module 200 which can be enabled, in the example embodiment, by means of a coasting bit 205 made available by a control unit (not shown). This ensures that the procedure according to the present invention is performed exclusively when the internal combustion engine is in coasting mode. Possible further input variables of the authorization module are the instantaneous rail pressure and/or the instantaneous temperature of the piezoactuator. By means of these further variables it is possible for the procedure to be performed only when a steady-state operating state of the injection system exists, allowing a substantial increase in the accuracy of the triggering voltage, which is what ultimately is to be determined. To keep the rail pressure as constant as possible while the procedure is being carried out, a rail pressure control system 210 is additionally provided, operation of which is activated by authorization module 200. Also correspondingly activated is a function module 215 for triggering the injection actuators and subsequently adapting the triggering signals, in accordance with the present invention. A further input signal 220 of function module 215 just mentioned is made available, in the present example embodiment, by a rotation speed signal evaluation module 225 that performs an injection detection on the basis of a rotation speed signal made available by the control unit.

Figure 4:
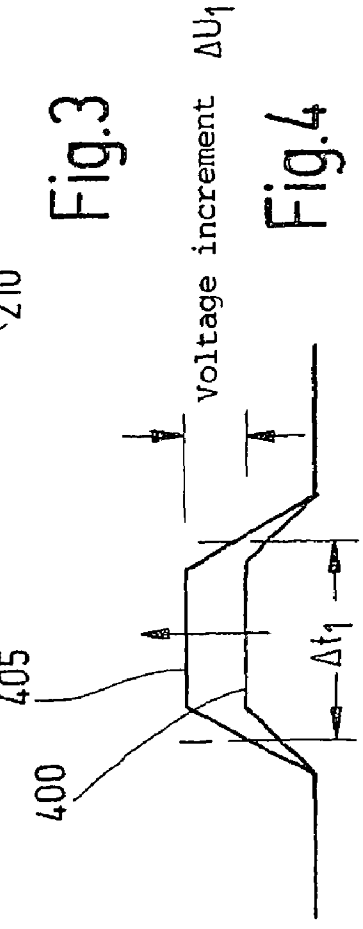
FIG. 4 shows example triggering pulses to illustrate the triggering of a injection actuator according to an example embodiment of the present invention.

FIG. 4 depicts typical triggering voltage pulses in order to illustrate the stepwise increase in triggering voltage at constant triggering duration. First voltage pulse 400 differs from second voltage pulse 405 only by the voltage increment ΔU1 shown, the average pulse duration Δt1 shown being the same for both voltage pulses.

Figure 5:
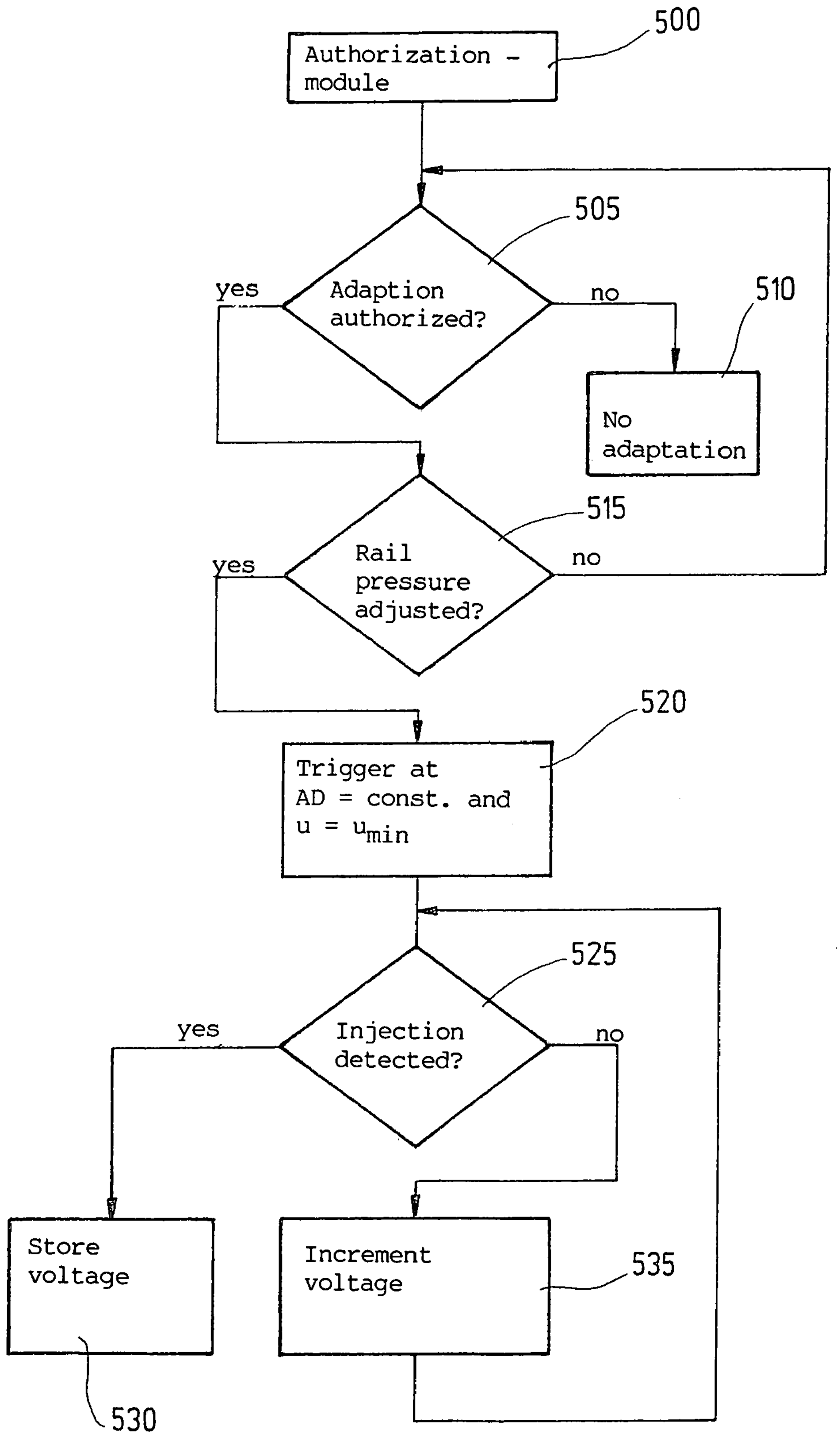
FIG. 5 shows, with reference to a flow chart, an example embodiment of the example procedure according to the present invention for triggering an injection actuator.

In the context of the example embodiment of a procedure according to the present invention shown in FIG. 5, it is assumed that a triggering of an individual injection actuator or injector is being performed. It is additionally assumed that the subsequent steps are being carried out by means of the aforementioned authorization module 500, exclusively when the internal combustion engine is in coasting mode.

As shown, step 505 first checks whether an authorization for adaptation of the triggering voltage of the injection actuators has occurred. If that authorization has not occurred, adaptation is not performed 510. If adaptation has been authorized, the next step 515 checks whether the rail pressure has already been adjusted, by means of the aforesaid rail pressure control system 210, to a value lying within definable bounds. If the adjustment is not yet complete, execution branches back to step 505. Otherwise a triggering 520 of an individual injection valve or injector is performed, and its piezoactuator initially has applied to it a voltage U_min which is selected so that an injection does not yet occur in the injector. In other words, the magnitude of voltage U_min is selected so that it is not yet sufficient, given the rail pressure existing in the rail, to open the control valve and cause an injection. The aforesaid triggering 520 occurs with a predetermined fixed triggering duration AD=const.

During the above-described triggering action and subsequent ones, the system reaction, i.e., the occurrence of an injection into the combustion chamber of the internal combustion engine associated with the triggered injector, is in each case monitored 525. In the present example embodiment, this is accomplished by means of rotation speed signal evaluation module 225 already mentioned. If an injection is detected, the triggering voltage U_erf causing it, together with the rail pressure value currently present, is permanently stored 530. If no injection is detected, however, the triggering voltage is incremented in steps 535, and the rotation speed signal is then monitored in each case, until a torque-creating and therefore rotation-speed-increasing injection is detected 525. The underlying triggering voltage U_erf at that time is correspondingly stored 530 together with the rail pressure value.

In the example embodiment, the procedure shown in FIG. 5 is carried out at different rail pressures, thus allowing a characteristic curve U_erf(p_Rail) to be acquired. The fineness of the previously described increments in the triggering voltage substantially determines the achievable variation of the characteristic curve values that are ascertained, and thus ultimately the maximum attainable precision in terms of fuel metering. The triggering voltage values thus ascertained each represent minimum voltages that, at the current rail pressure, result in an actuator motion and thus in an indirectly measurable injection.

The procedure described above can moreover be applied to all the combustion chambers (cylinders) of the internal combustion engine. It may be necessary in this context to regulate the rail pressure in coasting mode to a value that differs from the rail pressure usually existing at the relevant operating point of the internal combustion engine. The achievable rail pressure range is consequently also limited at the top end, so that adaptation can be performed only within a limited rail pressure range and an extrapolation must be performed for the remaining rail pressure range.

In another example embodiment, the triggering voltage value ascertained in each case is compared with target voltage values previously defined empirically, and a correction value is determined from any difference that results.

In a further example embodiment, the ascertained values of the triggering voltage are stored in the characteristic curve in filtered fashion. For example, if the rail pressure departs from the currently active pressure range defined by the characteristic curve, the respective re-adapted triggering voltage value is filtered, prior to storage, with the old voltage value, in particular is weighted therewith, thereby diminishing the influence of measurement disturbances during creation of the characteristic curve.

As already explained, the aforesaid injection detection is performed indirectly based on operating parameters of the internal combustion engine. The operating variable taken as the basis is, however, immaterial. As described above, one preferred operating parameter is the rotation speed or the value of a rotation speed signal made available by the internal combustion engine or a corresponding engine control unit. Also possible, in addition, are other variables already present in the control unit, for example the pressure signal made available by a combustion chamber pressure sensor, the knock signal made available by a knock sensor disposed in the combustion chamber, or the ion current signal made available by an ion current sensor.

In a further example embodiment, the magnitude of the triggering duration that is predefined in the method described above is selected so that the maximum injection quantity implemented at the current rail pressure is one that is not detectable by the driver of the underlying vehicle, so that the above-described adaptation procedure causes no impairments in terms of comfort.

It should be noted that the U_erf(p_Rail) characteristic curve described above is only an example, and that other parameter pairs—for example triggering voltage U_erf as a function of actuator temperature T_Piezo_Aktor—can be taken as the basis. The above-described injection system having a piezoelectrically controlled injection actuator is also to be understood only as an example embodiment, and can, for example, also encompass magnetically controlled actuators or the like.

The method described above can be implemented in a control unit shown in FIG. 1 in the form of a program routine or in the form of separate control elements of a corresponding apparatus. The details of such an implementation in terms of program engineering are familiar to one skilled in the relevant art given a knowledge of what is presented above, and will therefore not be explained here.

The method and apparatus described above have been explained using the example of a common rail injection system. The present invention is not limited to common rail injection systems, however, but rather can also be applied to other high-pressure injection systems, for example to unit injector systems.

What is claimed is:

1. A method for operating an injection system of an internal combustion engine having at least one injection actuator controllable by means of triggering pulses sensing and temporarily storing at least one state variable;

triggering the at least one injection actuator with a triggering pulse of definable pulse duration and definable initial pulse height;

during the triggering of the at least one injection actuator, performing an injection detection; incrementing the pulse height of the triggering pulse, at the defined pulse duration, until the injection is detected; and when the injection is detected, permanently storing the pulse height of the triggering pulse causing the injection as a function of the sensed state variable;

wherein in future operation of the injection system, the sensor state variable is taken as a basis for triggering the at least one injection actuator.

2. The method as recited in claim 1, wherein the pulse height of the triggering pulse causing an injection is permanently stored as a function of the sensed state variable of the injection system only if the state variable varies, in a time interval considered, only within a definable variability.

3. The method as recited in claim 1, wherein the initial pulse height of the triggering pulse is selected so that no injection yet occurs at the instantaneous value of the state variable.

4. The method as recited in claim 1, wherein the steps are performed for at least two different values of the state variable, and respectively resulting pulse heights of the triggering pulse causing an injection are permanently stored as a function of the respective value of the state variable in a table, a characteristics diagram, or a characteristic curve, and the table or characteristics diagram or characteristic curve is taken as the basis, in future operation of the injection system, for triggering the at least one injection actuator.

5. The method as recited in claim 4, wherein the respectively resulting pulse heights of the triggering pulse are stored in the table or characteristics diagram or characteristic curve in a manner filtered or weighted as a function of the respective value of the state variable.

6. The method as recited in claim 1, wherein the state variable of the injection system is constituted by one of a rail pressure instantaneously present in the injection system, a temperature instantaneously present in the injection system, sample-to-sample variations of the injection system, or sample-to-sample variation of components of the injection system.

7. The method as recited in claim 1, wherein the steps are performed only with the internal combustion engine in coasting mode.

8. The method as recited in claim 1, wherein injection detection is accomplished indirectly based on operating parameters of the internal combustion engine.

9. The method as recited in claim 8, wherein the injection detection is accomplished indirectly based on at least one of a rotation speed signal, a combustion chamber pressure signal, a knock signal, and an ion current signal of the internal combustion engine.

10. The method as recited in claim 1, wherein the steps are performed cyclically for all combustion chambers of the internal combustion engine.

11. The method as recited in claim 1, wherein the pulse height of the triggering pulse causing the injection is compared with a definable target value, and wherein a correction variable is determined from a deviation of the pulse height and the target value with which the injection system is operated in the future.

12. The method as recited in claim 1, wherein the pulse duration of the triggering pulses is selected so that given a prevailing value of the state variable, an injection quantity is implemented that ensures a least possible influence on operation of the internal combustion engine.

13. An apparatus for controlling an injection system of an internal combustion engine, the injection system comprising at least one injection actuator controllable by means of triggering pulses, and triggering of the injection actuator being performed based on at least one state variable of the injection system, the apparatus comprising:

a first arrangement configured to sense the at least one state variable and to temporarily store the state variable that is sensed;

a second arrangement configured to trigger the at least one injection actuator with a triggering pulse of definable pulse duration and definable initial pulse height;

a third arrangement configured to perform an injection detection upon triggering the at least one injection actuator;

a fourth arrangement configured to increment the pulse height of the triggering pulse in definable steps at the defined pulse duration; and a fifth arrangement configured to permanently store the pulse height of the triggering pulse causing the injection as a function of the sensed state variable, in an event an injection is detected.

14. The apparatus as recited in claim 13, wherein the fifth arrangement includes a comparator by means of which a check is made as to whether the state variable is varying, in the time interval considered, within a definable variability, the pulse height of the triggering pulse causing the injection being permanently stored as a function of the sensed state variable of the injection system only if the comparator ascertains that the state variable is varying, in the time interval considered, within the definable variability.

15. The apparatus as recited in claim 13, wherein the fifth arrangement includes at least one table, characteristics diagram, or characteristic curve for permanent storage of the pulse height of the triggering pulse causing the injection as a function of the sensed state variable, which height is taken as the basis, in future operation of the injection system, for triggering the at least one injection actuator.

16. The apparatus as recited in claim 13, further comprising:

a sixth arrangement configured to detect a coasting mode of the internal combustion engine.

* * * * *